Patented July 23, 1940

2,209,245

UNITED STATES PATENT OFFICE 2,209,245

DIETHYLCARBAMATES OF RESORCINOL-MONO-ALKYL ETHERS AND A PROCESS OF PREPARING THEM

Erich Bartholomäus, Wiesbaden-Biebrich, Germany, assignor to Winthrop Chemical Company, Inc., New York, N. Y., a corporation of New York No Drawing. Application March 1, 1938, Serial No. 193,286. In Germany March 4, 1937

4 Claims. (Cl. 260—482)

The present invention relates to diethylcarbamates of resorcinol-mono-alkyl ethers and to a process of preparing them.

I have found that the diethylcarbamates of resorcinol-mono-alkyl ethers and the homologues thereof have an excellent vermicide action.

The new compounds have the following general formula:

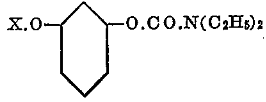

wherein X stands for an alkyl residue containing 1 to 4 carbon atoms. These compounds are oily substances which scarcely dissolve in water but readily dissolve in organic solvents.

For preparing the new compounds resorcinol-mono-alkyl ethers or the homologues thereof are transformed into the corresponding diethylcarbamates, or the resorcinol-mono-carbamic acid esters diethylated at the nitrogen or the homologues thereof are alkylated. For instance, the mono-alkyl ethers of resorcinol or the homologues thereof may be converted by means of phosgene into the carbamic said chlorides which by a reaction with diethylamine yield the corresponding diethylcarbamates. With the same result resorcinol-mono-alkyl ethers may be transformed by means of diethylcarbamic acid chloride directly into the corresponding diethylcarbamates. Finally, the process may consist in transforming resorcinol at first into the corresponding mono-carbamic acid ester, diethylated at the nitrogen atom, and then cautiously alkylating the ester.

The new compounds have a distinctly vermicide action in some cases towards ascarides, in others against bothriocephalus, and in others against both parasites; they are therefore useful in therapeutics.

The following examples serve to illustrate the invention but they are not intended to limit it thereto; the parts are by weight unless otherwise stated:

1. *Resorcinol-mono-methyl ether-diethylcarbamate*

26 parts of resorcinol-mono-methyl ether and 18 parts of pyridine are dissolved in 67 parts by volume of toluene. This solution is introduced, while stirring and cooling with a freezing mixture, into 200 parts by volume of a solution of 25 per cent. strength of phosgene in toluene and the mixture is allowed slowly to attain room temperature. After standing for 2 to 3 hours the whole is again cooled with ice, ice is introduced and the toluene solution is extracted by shaking it with ice-cold dilute hydrochloric acid and then with water. After hastily drying the toluene solution with sodium sulfate most of the excess of phosgene is evaporated under reduced pressure and the solution is introduced, while cooling with ice and stirring, into a mixture of 80 parts of diethylamine and 30 parts by volume of dry ether. After a short standing the reaction is finished. The solution is now successively extracted with ice-cold dilute hydrochloric acid, ice-cold dilute caustic soda solution and water and dried with sodium sulfate. After the solvent has been distilled the resorcinol-mono-methyl ether-diethylcarbamate remains in a good yield in the form of a yellowish oil, which boils under a pressure of 2 millimeters at 138° C. to 140° C.

2. *Resorcinol-mono-ethyl ether-diethylcarbamate*

Equal parts of resorcinol-mono-ethyl ether and diethylcarbamic acid chloride are heated for 4 hours on the vapour bath during which operation hydrochloric acid gas escapes. After cooling, the whole is dissolved in ether, extracted as described above and after drying the ether is distilled. The remaining crude product represents a nearly theoretical yield; it is purified by a distillation under reduced pressure. It boils under a pressure of 3 millimeters at 151° C.

3. *Resorcinol-mono-(n)-butyl ether diethyl-carbamate*

In the same manner the corresponding butyl ether is obtained from equivalent quantities of resorcinol-mono-(n)-butyl ether and diethyl-carbamic acid chloride in the same good yield. It boils under a pressure of 2 millimeters at 155° C.

4. *Resorcinol-mono-diethylcarbamate*

271 parts of diethyl-carbamic acid-chloride are added to a mixture of 220 parts of resorcinol and 100 parts by volume of pyridine. After standing for some time the mixture is heated on the vapor bath until the evolution of hydrochloric acid gas ceases. The whole is then cooled, dissolved in ether and extracted several times with a dilute sodium carbonate solution and then with ice-cold, dilute caustic potash solution. This alkaline solution is acidified by means of ice-cold, dilute sulfuric acid and then extracted with ether. After the ether has been dried by means of sodium sulfate, filtered and evaporated, the residue is fractionated. During this operation the resorcinol-mono-diethylcarbamate distils under a pressure of 2 millimeters at 177° C. to 179° C. It forms a yellowish oil which soon solidifies to a colorless crystalline mass. After redissolving it in benzene there are obtained colorless prismatic crystals melting at 64° C. to 66° C.

5. *Resorcinol-mono-methylether-diethylcarbamate*

To a solution of 52 parts of resorcinol-mono-diethylcarbamate in 200 parts by volume of methylol there are added at the same time drop by drop, while stirring and cooling with water, 32 parts of methyl sulfate and 32 parts of concentrated caustic potash solution. After the introduction is terminated the whole is allowed to stand for some time and is then diluted with water; the oil which has separated is dissolved in ether and the ethereal solution is extracted several times with a dilute liquor. After drying the ethereal solution is evaporated and the residue is fractionated. The resorcinol-mono-methylether-diethylcarbamate has the same properties as the product prepared according to Example 1.

I claim:

1. The compounds of the following general formula

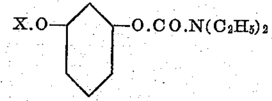

wherein X stands for an alkyl residue containing 1 to 4 carbon atoms.

2. Resorcinol-mono-methyl ether-diethylcarbamate.

3. Resorcinol-mono-ethyl ether-diethylcarbamate.

4. Resorcinol-mono-(n)-butyl ether-diethylcarbamate.

ERICH BARTHOLOMÄUS.